Oct. 4, 1932.  W. H. DE LANCEY  1,880,868
LIQUID SAMPLING DEVICE
Filed Sept. 19, 1931
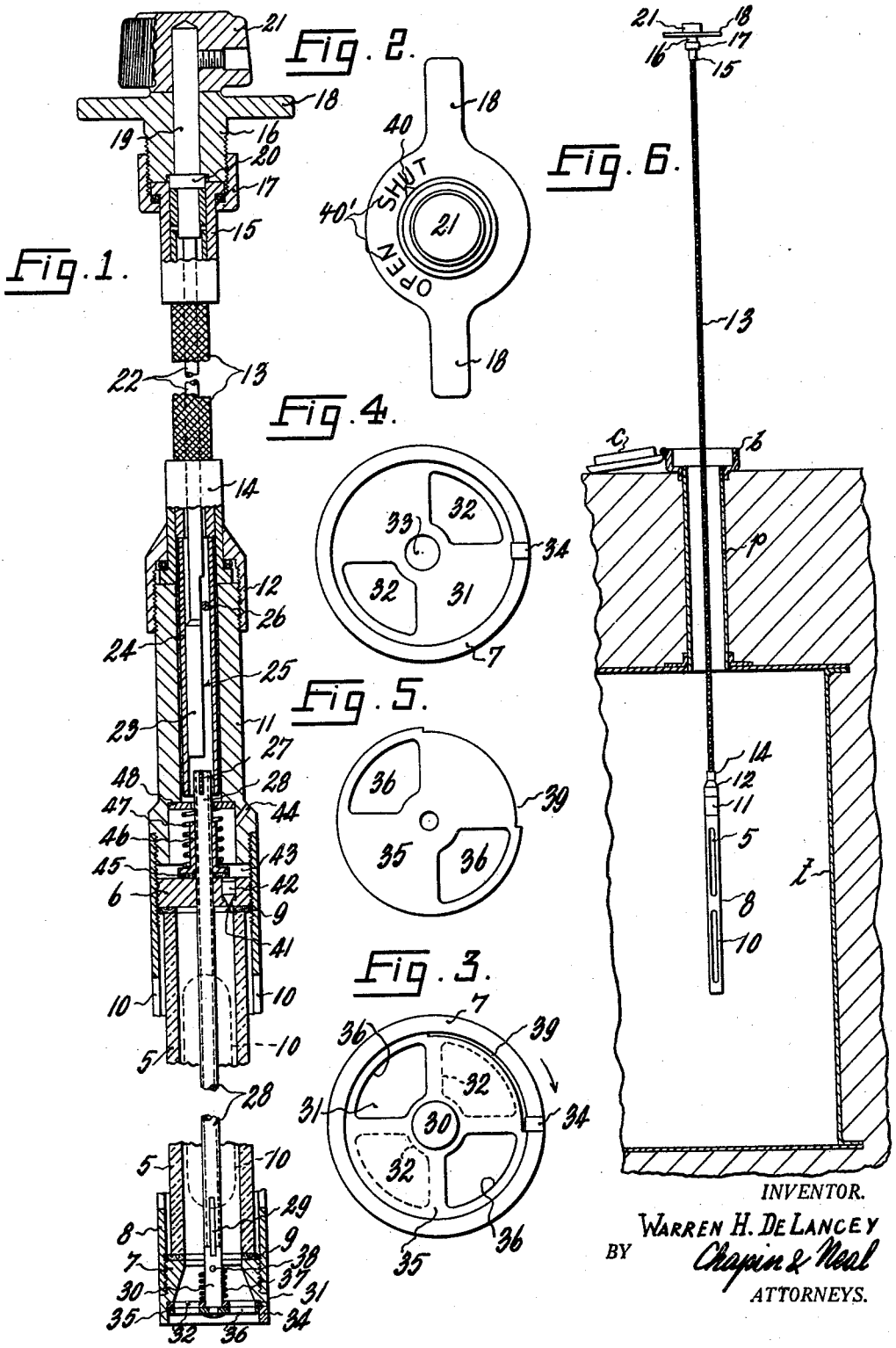
INVENTOR.
WARREN H. DE LANCEY
BY Chapin & Neal
ATTORNEYS.

Patented Oct. 4, 1932

1,880,868

UNITED STATES PATENT OFFICE

WARREN H. DE LANCEY, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID SAMPLING DEVICE

Application filed September 19, 1931. Serial No. 563,801.

This invention relates to an improved device for taking a sample of liquid from a source of supply, such as a tank for example.

The invention has for an object the provision of a device, for the purpose stated, which is in the nature of a tube, having a valve controlled opening in its lower end and having also means for operating the valve from a remote point, irrespective of the particular position which the sampling tube may occupy in the tank. The tube has connected to its upper end the sheath element of a flexible shaft and this element affords a means for lowering the sampling tube into the tank and withdrawing it therefrom, while within this sheath is a flexible shaft or equivalent means for controlling the valve.

Other features of the invention will appear as the detailed description proceeds and will be pointed out in the appended claims.

The invention will be disclosed with reference to the accompanying drawing, in which:

Fig. 1 is a sectional elevational view of a device embodying the invention;

Fig. 2 is a top plan view thereof;

Fig. 3 is an enlarged bottom plan view;

Figs. 4 and 5 are similar views showing separately the two elements of the valve shown in Fig. 3; and Fig. 6 is a small scale sectional elevational view illustrative of the use of the device.

Referring to this drawing; the sampling device consists of an elongated container, of relatively small cross sectional area, which may be readily lowered into the liquid supply tank through any of the openings usually provided therein. As shown, the container comprises a glass tube 5 and upper and lower heads 6 and 7, respectively, between which the tube is clamped and by which the ends of the tube are closed except for certain openings hereinafter described. The heads 6 and 7 are held together by a thin shell or casing 8, opposite ends of which are interiorly threaded to receive the exteriorly threaded heads. A gasket 9 is interposed between each head and the adjacent end of tube 5. The shell 8 is slotted as at 10, at points intermediate its threaded ends, so as to render visible the glass tube 5 and the contents thereof.

There is also attached to the upper end of shell 8 a hollow cylindrical member 11, threaded at one end into the shell and threaded at the opposite end to receive a gland nut 12. This nut serves as a means to secure to member 11 one end of the tubular sheath 13 of a flexible shaft. The flexible sheath has fixed thereto rigid flanged tubular end members 14 and 15. The flange of member 14 is clamped against the end of member 11 by nut 12 and the flange of member 15 is clamped against one end of an exteriorly threaded hub 16 by a gland nut 17. The hub 16, at its other end, is integrally united to diametrically opposed arms 18 which afford handles for the device.

Rotatably mounted in hub 16 is a stub shaft 19, which has near one end a flange 20, bearing against one end of the hub. Shaft 19 passes through the hub and has secured thereto a knurled knob 21, by means of which the shaft may conveniently be turned. The shaft, which is held against axial movement in hub 16 by the knob 21 and flange 20, has fixed to its inner end one end of a flexible shaft 22, which passes through the flexible sheath 13 and enters the hollow cylindrical member 11. The inner or lower end of this shaft is of enlarged diameter, as shown at 23, and closely fits the inner wall of a cylindrical tube 24, which lies within the bore of member 11. This part 23 is milled off along one side leaving a flat face 25 which slidably engages a pin 26, fixed in and passing transversely through tube 24. The shaft therefore turns this tube and is free to slide, when necessary, axially of the tube. At its inner end, the tube has fixed thereto a diametrically disposed cross bar 27, which is engaged in a similarly disposed slot in a rigid tubular shaft 28. Shaft 28 is rotatably mounted in head 6 and passes through the same into the glass tube 5, terminating near the lower end of the same with a detachable connection 29 to a short stub shaft 30 which operates the valve.

The valve is shown in Fig. 5 and its seat in Fig. 4. The assembly of these elements is shown in Fig. 3. The valve seat 31 is in the form of a circular disc fixed in the circular opening of the lower head 7. This disc has two diametrically opposed openings 32 therethrough and a central opening 33 which affords a bearing for shaft 30. Fixed in the head 7 below seat 31 is a pin 34 projecting radially inwardly a short distance. The valve 35 is similar in form to the seat and has diametrically opposed openings 36 of the same size and shape as openings 32. The valve 35 is fixed to the lower end of shaft 30 and is held against seat 31 by a spring 37 which acts against a pin 38 in shaft 30 to lift the same as far as possible. The periphery of valve 35 has a slot 39 therein in which pin 34 is engaged. This pin limits the movement of valve 35 to about ninety degrees and allows it to be turned in the direction of the arrow shown in Fig. 3 from the fully closed position there shown to a position in which the openings 36 in the valve register with the openings 32 in the overlying seat. The handle 21 has a pointer 40 (Fig. 2) thereon which shows by reference to the designations 40′ on the upper and outer face of hub 16, the position of the valve.

The upper head 6 has a vent passage 41 therethrough and a valve 42, closing by gravity, normally closes this passage. As liquid enters the base of tube 5, the valve 42 will open to permit escape of air through passage 41 into the chamber 43 and thence by way of a passage 44 in member 11 to the exterior of the device.

Escape of liquid from tube 5 around shaft 28 where it passes through head 6 is prevented by a packing ring 45 which encompasses the shaft and lies against the upper face of the head. A flanged sleeve 46, slidable on shaft 48, is pressed by a spring 47 acting between a washer 48 in member 11 and the flange on the sleeve, against the packing and holds the same tightly against head 6.

In the practical use of the device, the tube 5, with the valve in its lower end open, is lowered into the opening in a liquid supply tank, using the sheath 13 of the flexible shaft, as a suspending means like a rope for the purpose. Liquid enters and fills the tube and, after sufficient time has been allowed for the purpose, the operator closes the valve 35 by turning knob 21 and then lifts the tube 5 out of the tank. Fig. 6 illustrates how the device can be used to withdraw a sample from an underground oil tank $t$. The cover $c$ of the fill box $b$ is opened and the tube 5 is lowered through the fill pipe $p$. The shaft 22 and its sheath 13 are of ample length to enable this to be done. The operator holds the sampling device by the handles 18 and has conveniently accessible the control knob 21 for the valve. The device allows samples to be taken from various selected levels in the tank. In some prior devices of this class, it is necessary to lower the device until it touches the bottom of the tank because contact with the tank is relied on to open the valve of the sampling tube. In the present device, the valve is manually operable at any position of the sampling device in the tank.

The invention has been disclosed herein, in an embodiment at present preferred, for illustrative purposes, but the scope of the invention is defined by the appended claims rather than by the foregoing description.

What I claim is:

1. A device for withdrawing a sample of liquid from a tank, comprising, an elongated container having an opening in its lower end, a flexible tubular member attached at one end to the upper end of the container by means of which the latter may be lowered into or withdrawn from the tank, a valve to open and close said opening, and means for turning said valve including a flexible shaft extending through said tubular member to the free end thereof.

2. A device for withdrawing a sample of liquid from a tank, comprising, an elongated container having an opening in its lower end, a flexible tubular member attached at one end to the upper end of the container by means of which the latter may be lowered into or withdrawn from the tank, a valve to open and close said opening, a handle attached to the opposite end of said tubular member, means for turning said valve including a flexible shaft passing through said tubular member, and an operating member secured to the free end of said shaft and mounted on said handle.

In testimony whereof I have affixed my signature.

WARREN H. DELANCEY.